July 6, 1954

J. F. GORDON 2,683,252

CRYSTAL CONTROLLED ANGLE MODULATION SYSTEM

Filed May 25, 1950

Inventor
JAMES F. GORDON

By Killman & Kerst
Attorney

July 6, 1954  J. F. GORDON  2,683,252
CRYSTAL CONTROLLED ANGLE MODULATION SYSTEM
Filed May 25, 1950  3 Sheets-Sheet 2

Inventor
JAMES F. GORDON
By Killman & Kerst
Attorney

July 6, 1954          J. F. GORDON          2,683,252

CRYSTAL CONTROLLED ANGLE MODULATION SYSTEM

Filed May 25, 1950          3 Sheets-Sheet 3

Inventor
JAMES F. GORDON

By Killman & Kerst
Attorney

Patented July 6, 1954

2,683,252

UNITED STATES PATENT OFFICE 2,683,252

CRYSTAL CONTROLLED ANGLE MODULATION SYSTEM

James F. Gordon, Baltimore, Md., assignor to Bendix Aviation Corporation, Towson, Md., a corporation of Delaware Application May 25, 1950, Serial No. 164,195

8 Claims. (Cl. 332—26)

1

This invention relates to a system for the production of angle modulated waves in which the frequency of the carrier is crystal controlled and highly stable but which possesses a high degree of modulation sensitivity.

Two primary methods have been employed in the past for obtaining frequency modulated carriers from direct crystal control. One operates by the angular velocity modulation of energy taken from the crystal oscillator, the frequency deviation being proportional to the amplitude of a modulating voltage feeding through a 1/F network.

This arrangement has the disadvantage of being more complicated and requiring more critical adjustment and maintenance than is desirable for simple transmitting equipment. It also requires considerable frequency multiplication for high frequency operation since the maximum deviation is restricted to a relatively small value at the source.

The second method involves direct modulation of the crystal oscillator circuit. This method operates under greater performance restrictions than the first. The maximum percentage of deviation which can be obtained is very small and the total harmonic distortion may readily reach 10%. In some cases this value has even been exceeded as the best compromise obtainable between circuit performance and economy.

In many modulated crystal oscillator circuits a substantial percentage of amplitude modulation is present as a result of the audio input. It is necessary to eliminate this modulation from the output circuits by suitable limiting in the earlier stages.

Among the objects of the present invention are:

To provide a crystal controlled generator of angle modulated energy which is capable of providing larger deviations than could heretofore be obtained with no sacrifice of transmitter stability;

To provide such a generator employing a small number of vacuum tubes in a simple circuit;

To provide a crystal controlled generator of angle modulated energy which is capable of operating on any one of a wide range of even or odd harmonics of the crystal frequency;

To provide a crystal controlled generator of angle modulated energy in which amplitude modulation of the output is kept to a very low level; and, To provide a crystal controlled generator of angle modulated energy which requires no modulator adjustments during operation.

2

The objects and advantages of the invention are realized by a two stage regenerative circuit in which the first stage is a grounded grid amplifier having its anode capacitively coupled to the control grid of the second stage which functions as a cathode follower. The cathodes of the two stages are coupled by a crystal connected to operate in its series mode, the crystal being shunted by a capacitor of such value as to cause the circuit to be regenerative in the absence of the crystal. The regeneration may be such as to render the circuit oscillatory in the absence of the crystal so long as the crystal, when present, can retain control of frequency. The plate circuit of the second stage includes a resonant circuit tuned to a desired harmonic of the crystal frequency. Modulation may be accomplished by applying modulating voltage to the grid or cathode circuits of either stage. The modulating voltage may also be applied in push-pull to the grids or cathodes. The gain of the first stage may be utilized by grounding its grid for R. F. only, applying audio voltage to its input circuit and coupling its audio output to the second stage. Another modulation arrangement employs a reactance tube to vary the effective capacity shunted across the crystal.

Figure 2:
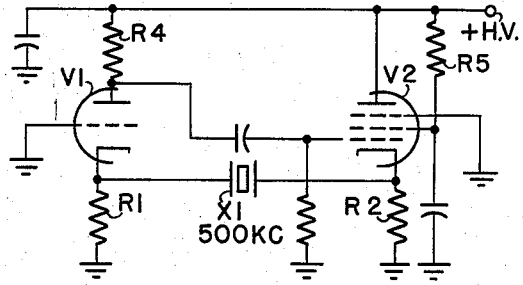
Fig. 2 is a schematic diagram of a circuit similar to Fig. 1 but having the capacitive coupling replaced by a crystal.
Figure 1:
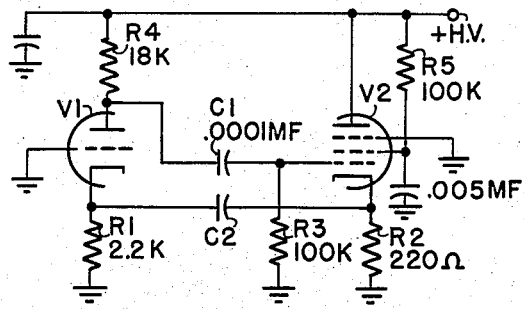
Fig. 1 is a schematic circuit diagram of a two stage regenerative circuit of the prior art employing capacitive coupling between the cathode circuits.
Figure 3:
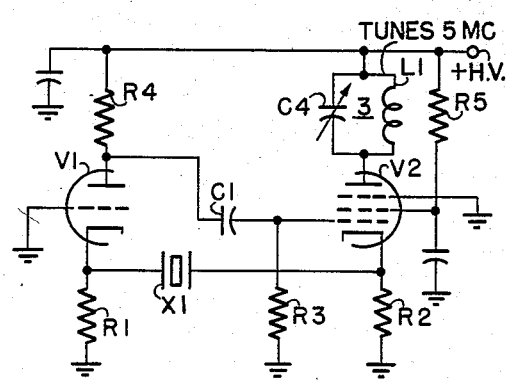
Fig. 3 is a schematic circuit diagram of a circuit similar to that of Fig. 2 but including a resonant circuit in the plate circuit of the second stage.

The circuits of Figs. 1, 2 and 3 are in the prior art but are included here to afford a more orderly and logical explanatory development of the invention.

The circuit of Fig. 1 illustrates a two stage, multivibrator type of relaxation circuit comprising tubes $V_1$ and $V_2$. $V_1$ is illustrated as a triode having its control grid grounded and its cathode connected to ground through a resistor $R_1$. Tube $V_2$ is a pentode having its cathode grounded through a low resistor $R_2$. The anode of $V_1$ is coupled to the control grid of $V_2$ by a condenser $C_1$. The control grid of $V_2$ is grounded through a resistor $R_3$. The anode of $V_1$ and the screen grid of $V_2$ are connected to a source of positive high voltage through resistors $R_4$ and $R_5$ respectively. The anode of $V_2$ is directly connected to this source. The cathodes of the two tubes are coupled by a condenser $C_2$.

In this arrangement $V_1$ operates as a grounded grid amplifier and $V_2$ as a cathode follower. The coupling of the anode of $V_1$ to the control grid of $V_2$ and the coupling of the two cathodes by the condenser $C_2$ completes a relaxation circuit of the multivibrator type having an output across $R_3$ of the form illustrated by curve 1 of Fig. 7.

Figure 7:
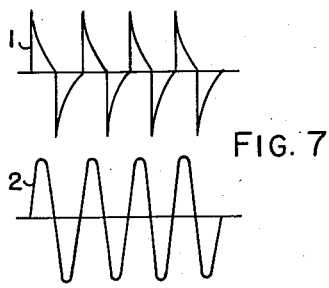
Fig. 7 is a plurality of curves illustrating waveforms existing in the circuits of the previous figures.

By replacing the condenser $C_2$ with a crystal $X_1$ as shown in Fig. 2, the remainder of the circuit remaining unchanged, an output of sine form as shown by curve 2 of Fig. 7 can be obtained. This circuit is of the type disclosed by Butler in the magazine "Wireless Engineer" in the issue of November 1944, pages 525 and 526. It provides a crystal controlled oscillator of high stability with the crystal operating in its series mode. The output of this circuit will be at the fundamental frequency of the crystal $X_1$.

An output at a selected electrical harmonic of the fundamental frequency of the crystal $X_1$ can be obtained from the circuit of Fig. 2 by providing, as shown in Fig. 3, a tuned circuit 3 composed of condenser $C_4$ and coil $L_1$ in the anode circuit of tube $V_2$. The oscillatory circuit described above operates independently of the tuning of this resonant circuit, the latter receiving impulses by way of the tube $V_2$ at a sub-multiple at its resonant frequency. The output from the circuit can be obtained by conventional coupling arrangements to the resonant circuit 3. This circuit is very stable and cannot be satisfactorily modulated.

Figure 4:
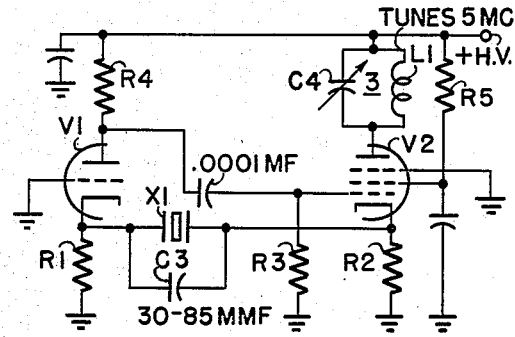
Fig. 4 is a schematic circuit diagram of a circuit embodying the invention.

In accordance with the invention, however, a circuit from which angle modulated outputs at both odd and even electrical harmonics of the series mode crystal frequency can be obtained, may be realized by shunting the crystal in the manner shown in Fig. 4 with a capacitor $C_3$ having a capacity such that it will, in the absence of the crystal, provide sufficient coupling to render the circuit regenerative. The circuit may in some cases be adjusted to be oscillatory in the absence of the crystal, so long as the crystal may, when present, control the frequency. With the crystal present the circuit will oscillate with the production of an output waveform of the shape of curve 1 of Fig. 7. The frequency of oscillation in this case is primarily determined by the time constant provided by the RC elements of the circuit. This frequency is made to be of the order of the crystal frequency.

It can be seen that the circuit is regenerative, either being oscillatory without the crystal, or becoming oscillatory only by virtue of the presence of the crystal, and that its frequency is controlled by the crystal, the circuit being triggered off into a relaxation excursion shortly following each time at which the crystal voltage changes its sign.

Since the control grid of $V_2$ is driven by short duration pulses of high amplitude, the tuned circuit 3 in its plate circuit will serve as a satisfactory generator of harmonics of the fundamental crystal frequency and may be tuned to an even or odd harmonic of that frequency.

The series resonant operation of the crystal allows a relatively large capacity to be placed in shunt with it without seriously affecting its stability because of the low impedance of the crystal. It is for this reason that the circuit may be made regenerative without the occurrence of the normally expected degradation of crystal performance. A condenser $C_3$ having a capacity between the limits of 30 to 85 mmf. has been found satisfactory with a CT cut crystal of a frequency of 500 kc. and with other circuit values as shown in Fig. 1.

Figure 5:
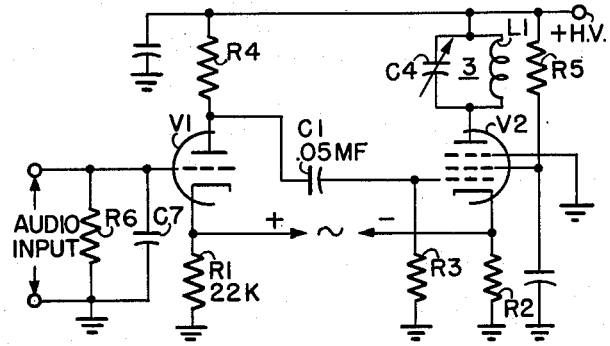
Fig. 5 is a schematic circuit diagram of a circuit similar to that of Fig. 1 but omitting the cathode coupling circuit and showing an arrangement for modulating the grid of the first stage.

Modulation of the circuit may be effected in many ways. A preferred modulating circuit is illustrated in Fig. 5. In this circuit the grid of $V_1$ is bypassed to ground for radio frequency by a condenser $C_7$ shunted by a grid resistor $R_6$, the capacity of the condenser $C_7$ being of such value as not to pass appreciable currents of audio frequency. Modulation voltage is then applied across the resistor $R_6$. The coupling condenser $C_1$ is increased to a value of .05 mfd. as indicated or to a value sufficient to couple voltage of audio frequency to the grid of tube $V_2$. The circuit of Fig. 5 has been drawn with no coupling between the cathodes to indicate the audio polarity across them. To illustrate the polarity of the voltage available for coupling back from $V_2$ to $V_1$, consider the effect of the application of a positive voltage increment to the control grid of $V_1$. As the grid becomes more positive the flow of space current through $V_1$ will cause its cathode to likewise become more positive as indicated. Space current flow will cause a negative voltage increment to be coupled by condenser $C_1$ to the control grid of $V_2$. The cathode of this tube will follow the control grid, thus rendering available for feedback at the cathode of $V_2$ a modulating voltage which is in antiphase with the modulating voltage of the cathode of $V_1$. With the coupling circuit comprising the crystal $X_1$ and its shunting condenser $C_3$ in place, the phase shifts occurring in the coupling circuit vary as a function of the amplitude of the modulating voltage. This has the effect of varying the point along the slope of the sine wave output of the crystal $X_1$ which is effective to trigger the relaxation excursions of the circuit, thus applying an angle modulation to the occurrence of the peaks of the waveform 1 of Fig. 7. This in turn angle modulates the circulating currents in the resonant circuit 3 to provide an output having a corresponding modulation.

The condenser $C_7$ of Fig. 5 may perform an additional function to that of acting as an R. F. bypass. It may, together with a resistance not illustrated in Fig. 5, but which may be considered as being a part of the modulation source or as constituting the fundamental impedance of the modulation source, form a 1/F network such as is normally used to convert the output of a phase modulation system to frequency modulation. The output of the circuit of Fig. 5 will normally be phase modulated but a frequency modulated output may be obtained by choice of the value of condenser $C_7$ to provide a 1/F network as explained above.

Figure 8:
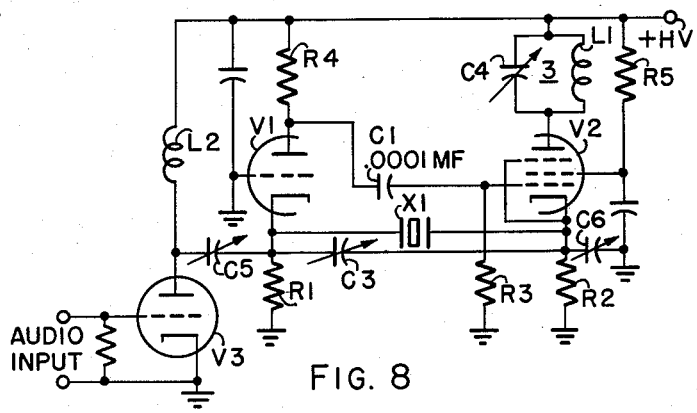
Fig. 8 is a schematic circuit diagram of a circuit similar to that of Fig. 4 utilizing a reactance tube to modulate the circuit.
Figure 9:
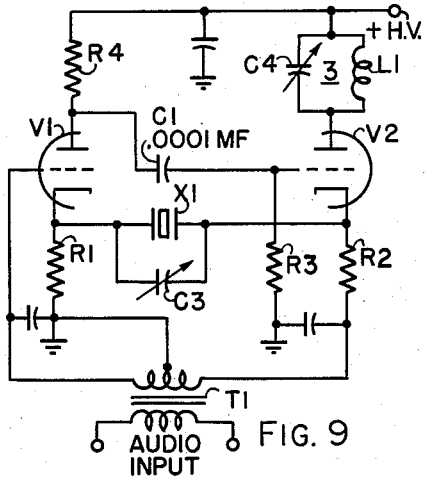
Figs. 9 and 10 are schematic circuit diagrams of circuits resembling that of Fig. 4 illustrating the application of modulating voltage to the grids and the cathodes respectively of the two stages.
Figure 10:
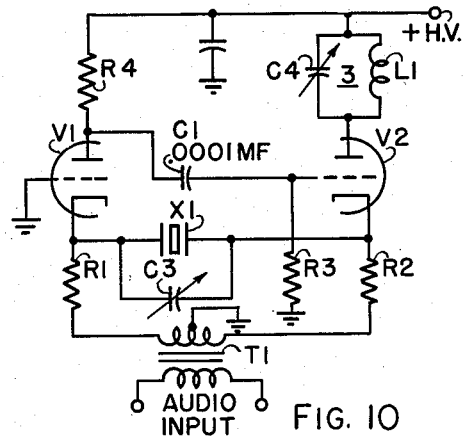

Modulation may be accomplished in other ways as illustrated by Figs. 8, 9 and 10. The circuit of Fig. 8 illustrates the use of a reactance tube $V_3$, the anode of which is coupled by a condenser $C_5$ to the cathode of $V_1$. The control grid of $V_1$ is grounded and the cathode of $V_2$ is connected to ground through a variable condenser $C_6$. The anode of $V_3$ is connected by way of a choke $L_2$ to the high voltage source. Application of audio voltage to the input circuit of tube $V_3$ results in providing an effective capacitive change across condenser $C_3$ to vary the point along the crystal output at which the regenerative circuit is triggered.

The circuit of Fig. 9 illustrates modulation by application of audio voltage by way of a transformer $T_1$ in phase opposition to the control grids of tubes $V_1$ and $V_2$.

In the circuit of Fig. 10 the modulating voltage is applied by way of transformer $T_1$ to the cathodes of the two stages.

The modulation arrangement of Fig. 5 is preferred since in that case the gain of the tube $V_1$ as an audio amplifier is available and is utilized for the modulation of $V_2$.

Figure 6:
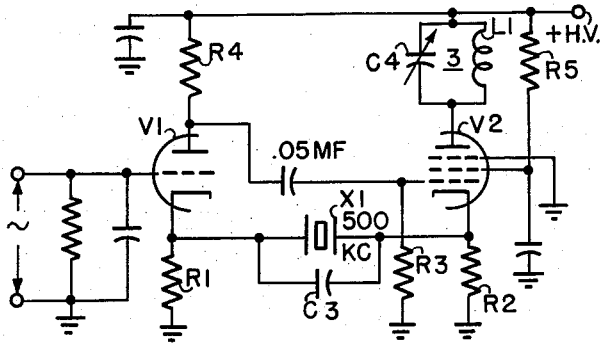
Fig. 6 is a schematic circuit diagram of the circuit of Fig. 5 with the cathode coupling circuit completed.
Figures 11, 12:
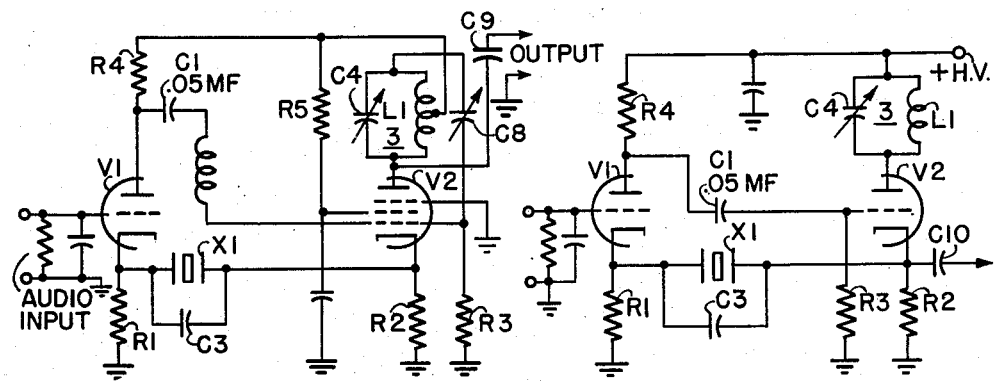
Fig. 11 is a schematic circuit diagram of a circuit resembling that of Fig. 4, but providing a means for strengthening the harmonic output of the circuit.
Fig. 12 is a schematic diagram of a circuit resembling that of Fig. 4, showing a means for deriving angle modulated output pulses from that circuit.

The circuit of Fig. 11 illustrates a means of strengthening the harmonic output of the circuit of Fig. 6 by the addition of a feedback line including a condenser $C_8$ which feeds back the harmonic output of the tuned circuit 3 to the control grid of tube $V_2$. This has the effect of reducing the undesirable crystal frequency spurious response of the oscillator. Output is shown in this circuit as taken across the resonant circuit 3 by way of a coupling condenser $C_9$. It could also be taken by transformer coupling to the coil $L_1$ and the same is true of the other circuits shown.

The circuit of Fig. 12 shows a means for deriving angle modulated output pulses from the circuit of Fig. 6. The output is here taken at the cathode of $V_2$ through a coupling condenser $C_{10}$. This serves to recover the angle modulated pulses of the relaxation circuit waveform shown at 1 in Fig. 7. This output may be used as a pulse phase modulation source or as an oscillograph synchronizing source for the observation of the waveform on a time base.

Figure 13:
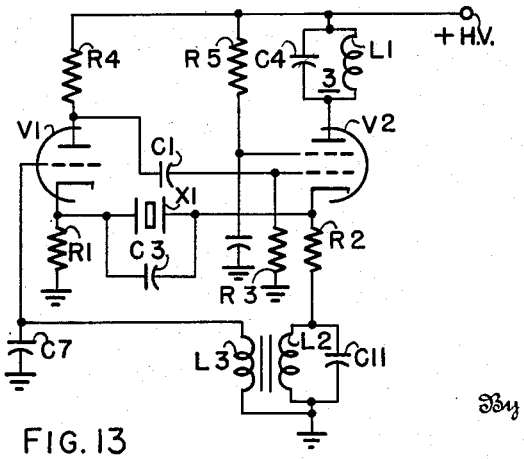
Fig. 13 is a schematic diagram of a circuit similar to that of Fig. 6 arranged to be self oscillatory at an audio frequency.

Fig. 13 illustrates an adaptation of the circuit of Fig. 6 in which the regenerative circuit is made self-oscillatory at an audio frequency in order to provide tone modulation. This is accomplished by inserting a parallel resonant circuit composed of condenser $C_{11}$ and coil $L_2$ in the cathode circuit of $V_2$ with the resonant circuit connected between $R_2$ and ground. This circuit is tuned to the desired tone frequency and is coupled through a coil $L_3$ to the control grid of $V_1$ across condenser $C_7$, which provides an R. F. by-pass as in Fig. 6. Condenser $C_{11}$ also passes R. F. to ground.

With this arrangement the frequency of the resonant circuits $L_2$, $C_{11}$ is applied to the input of $V_1$ as a modulation voltage with the circuit operating in other respects as in Fig. 6. The circuit is thus self-oscillatory at the modulation frequency as well as at the R. F. determined by the crystal. The tone frequency is available for reference purposes in test equipment.

It will be noted that in some figures of the drawing triodes have been used for the tube $V_2$, while in other figures pentodes have been shown. It should be understood that either type of tube is usable in any of the circuit variations shown.

If desired, alternating current from a suitable, low impedance, constant frequency source external to the system may be utilized in lieu of the crystal. The source would be connected between the cathode in shunt with the condenser $C_3$ in the same manner as shown for the crystal. The impedance of the source should be comparable to that of the crystal.

The R. M. S. modulation voltage required for the production of maximum deviation, which is approximately one radian, is about .300 volt applied to the $V_1$ grid in the examples. This allows the direct use of a high quality microphone for modulation purposes without preamplifiers.

Circuits embodying the invention exhibit a high degree of frequency stability, a frequency change of only .003% having been noted for a change of 10 volts in plate supply voltage in a typical circuit. With the use of VR tubes, a 10% change in 60 cycle supply voltage to the unregulated unit power supply in a typical case produced only a .0003% change in frequency. An eight hour operating test with the circuit operating from regular 115 volt 60 cycle mains has shown a frequency drift, during the first hour of warm-up, within ±.0025%.

Using a 400 cycle modulating voltage with a circuit of the type shown in Fig. 6, a signal to noise ratio of 50 db with maximum deviation has been obtained, with the output of the circuit at the eighth harmonic of the crystal frequency.

Since the amplitude of the crystal oscillations is low with respect to the circuit oscillations, the audio voltage variation required to produce "slope triggering" of the circuit is correspondingly low. The .300 R. M. S. volt required for maximum deviation is not effective in producing large amplitude variation in the $V_2$ output and as a consequence only a very slight amplitude modulation results.

Since the circuit operates from the crystal controlled source without changing the crystal frequency during modulation, and because the amplitude of the crystal oscillation is very low and is not directly coupled to the output, the unmodulated stable crystal oscillation is prevented from occuring in the output circuit except in amounts of very small amplitude.

In circuits utilizing the invention the value of the crystal shunt capacity will affect, to a slight degree, the frequency of the regenerative circuit. Taking advantage of this fact, a means of tuning the circuit to establish a precise operating frequency is provided by merely varying the capacity of the condenser $C_3$.

Circuits embodying the invention possess a pronounced ability in the output circuit to lock on the harmonic of the crystal frequency which is nearest the frequency to which the circuit is tuned. This displays itself in an abrupt jump to the next approaching harmonic frequency as the circuit $C_4$, $L_1$ is tuned. This occurs by virtue of the small crystal harmonic content circulating independently of the circuit's regenerative character, which provides a phase lock for the harmonic generator derived from the crystal control even though the output circuit is tuned somewhat off resonance.

Many applications of the circuit, where extreme frequency stability and high modulation sensitivity are required, will suggest themselves. As an example, one use to which the circuit may be put is for the purpose of accurate frequency calibration. The resonant circuit 3 can be tuned by the variable condenser $C_4$ along an extended scale of harmonics of the crystal frequency and as each harmonic frequency is reached the output of the resonant circuit will assume the exact frequency of the harmonic with great accuracy. The circuit is thus available to provide for frequency calibration over an extended and unbroken range of harmonics of any selected crystal frequency.

The circuit accomplishes the work of a balanced modulator with the added features of frequency multiplication and increased modulation sensitivity. No modulator adjustments are required and as such the circuit becomes useful in equipments subject to operation by untrained personnel.

What is claimed is:

1. A frequency controlled angle modulation system comprising a two stage amplifier circuit, the first of said stages comprising an electron discharge device having an anode, a cathode and a control grid, means connecting said control grid substantially directly to ground, the second of said stages comprising an electron discharge device having an anode, a cathode and a control grid, means coupling the output of the first of said stages to the input of the second, means coupling the cathodes of said electron discharge device, said cathode coupling means comprising a piezoelectric crystal shunted by a capacitor, a resistor connected between each of said cathodes and ground, the time constant determined by said resistors and said capacitor being of such a value as to establish the oscillatory frequency of said coupled stages at substantially the frequency of said crystal, the capacity of said capacitor being such as to render said circuit regenerative in the absence of said crystal, and means applying modulating voltage to the input of at least one of said stages.

2. A crystal controlled angle modulation system comprising a pair of amplifier stages each comprising an electron discharge tube having an anode, a cathode and a control electrode, the control electrode of the first of said stages being grounded, means coupling the anode of the first of said stages to the control grid of the second, means coupling the cathodes of said stages, the last named coupling means comprising a piezoelectric crystal shunted by a capacitor, a resistor connected between each of said cathodes and ground, the time constant determined by said resistors and said capacitor being of such a value as to establish the oscillatory frequency of said coupled stages at substantially the fundamental frequency of said crystal, the capacity of said capacitor being such as to render said coupled stages regenerative in the absence of said crystal, a tuned circuit in the output of said second stage, said tuned circuit being tuned to a harmonic of the fundamental frequency of said crystal, and means applying modulating voltage to the input of at least one of said stages.

3. A crystal controlled angle modulation system comprising a two stage amplifier circuit, the first of said stages comprising an electron discharge device having an anode, a cathode and a control grid, impedance means connecting said control grid to ground, said impedance means presenting a high impedance to currents of audio frequency and a very low impedance to currents of radio frequency, the second of said stages comprising an electron discharge device having an anode, a cathode and a control grid, means coupling the output of the first of said stages to the input of the other, said coupling means being effective to couple currents of audio frequency to said second stage, means coupling the cathodes of said electron discharge device, said cathode coupling means comprising a piezo-electric crystal shunted by a capacitor, a resistor connected between each of said cathodes and ground, the time constant determined by said resistors and said capacitor being of such a value as to establish the oscillatory frequency of said coupled stages at substantially the frequency of said crystal the capacity of said capacitor being of such value as to render said circuit regenerative in the absence of said crystal, a tuned circuit in the anode circuit of said second stage, said tuned circuit being resonant at a harmonic of the fundamental frequency of said crystal and means applying modulating voltage across said impedance means.

4. A crystal controlled angle modulation system comprising a two stage amplifier circuit, the first of said stages comprising an electron discharge device having an anode, a cathode and a control grid and being connected as a grounded grid amplifier, the second of said stages comprising an electron discharge device having an anode, a cathode and a control grid and being connected as a cathode follower, means coupling the output of the first of said stages to the input of the second, means coupling the cathodes of said electron discharge devices, said cathode coupling means comprising a piezo-electric crystal shunted by a capacitor, the capacity of said capacitor being of such value as to render said circuit regenerative in the absence of said crystal, a tuned circuit in the anode circuit of said second stage, said tuned circuit being resonant at a harmonic of the fundamental frequency of said crystal, a source of modulating potential and means coupling the output of said source in phase opposition to the control grids of said stages.

5. A crystal controlled angle modulation system comprising a two stage amplifier circuit, the first of said stages comprising an electron discharge device having an anode, a cathode and a control grid and being connected as a grounded grid amplifier, the second of said stages comprising an electron discharge device having an anode, a cathode and a control grid and being connected as a cathode follower, means coupling the output of the first of said stages to the input of the second, means coupling the cathodes of said electron discharge devices, said cathode coupling means comprising a piezo-electric crystal shunted by a capacitor, the capacity of said capacitor being of such value as to render said circuit regenerative in the absence of said crystal, a tuned circuit in the anode circuit of said second stage, said tuned circuit being resonant at a harmonic of the fundamental frequency of said crystal, a source of modulating voltage and means coupling the output of said source in phase opposition to the cathodes of said stages.

6. A crystal controlled angle modulation system comprising a two stage amplifier circuit, the first of said stages comprising an electron discharge device having an anode, a cathode and a control grid and being connected as a grounded grid amplifier, the second of said stages comprising an electron discharge device having an anode, a cathode and a control grid and being connected as a cathode follower, means coupling the output of the first of said stages to the input of the second, means coupling the cathodes of said electron discharge devices, said cathode coupling means comprising a piezo-electric crystal shunted by a capacitor, the capacity of said capacitor being of such value as to render said circuit regenerative in the absence of said crystal, a tuned circuit in the anode circuit of said second stage, said tuned circuit being resonant at a harmonic of the fundamental frequency of said crystal, a second capaictor connected in series with the above mentioned capacitor, means connecting said second capacitor to ground, a source of modulating potential voltage responsive means for varying the conductivity of said connecting means, and means applying said modulating potential to said voltage responsive means.

7. A crystal controlled angle modulation system comprising a two stage amplifier circuit, the first of said stages comprising an electron discharge device having an anode, a cathode and a control grid, impedance means connecting said control grid to ground, said impedance means presenting a high impedance to currents of audio frequency and a very low impedance to currents of radio frequency, the second of said stages comprising an electron discharge device having an anode, a cathode and a control grid, means coupling the output of the first of said stages to the input of the other, said coupling means being effective to couple currents of audio frequency to said second stage, means coupling the cathodes of said electron discharge device, said cathode coupling means comprising a piezo-electric crystal shunted by a capacitor, the capacity of said capacitor being of such value as to render said circuit regenerative in the absence of said crystal, a tuned circuit in the anode circuit of said second stage, said tuned circuit being resonant at a harmonic of the fundamental frequency of said crystal, a second tuned circuit in the cathode circuit of said second stage, said second tuned circuit being resonant at an audio frequency, and means coupling the output of said second tuned circuit across said impedance means.

8. A crystal controlled angle modulation system comprising a two stage amplifier circuit, the first of said stages comprising an electron discharge device having an anode, a cathode and a control grid, impedance means connecting said control grid to ground, said impedance means presenting a high impedance to currents of audio frequency and a very low impedance to currents of radio frequncy, the second of said stages comprising an electron discharge device having an anode, a cathode and a control grid, means coupling the output of the first of said stages to the input of the other, said coupling means being effective to couple currents of audio frequency to said second stage, means coupling the cathodes of said electron discharge device, said cathode coupling means comprising a piezo-electric crystal shunted by a capacitor, a resistor connected between each of said cathodes and ground, the time constant determined by said resistors and said capacitor being of such a value as to establish the oscillatory frequency of said coupled stages at substantially the frequency of said crystal the capacity of said capacitor being of such value as to render said circuit regenerative in the absence of said crystal, a tuned circuit in the anode circuit of said second stage, said tuned circuit being resonant at a harmonic of the fundamental frequency of said crystal, a source of modulating voltage, and means applying voltage from the last named source across said impedance means, said impedance means constituting, with the impedance of the last named source, an impedance network having a translation characteristic which is inversely proportional to the frequency of the modulating voltage.

References Cited in the file of this patent

UNITED STATES PATENTS

| Number | Name | Date |
|---|---|---|
| 2,426,996 | Goodall | Sept. 9, 1947 |
| 2,437,872 | Bailey | Mar. 16, 1948 |
| 2,494,353 | Newman | Jan. 10, 1950 |
| 2,510,868 | Day | June 6, 1950 |
| 2,539,952 | Hepp | Jan. 30, 1951 |
| 2,546,027 | Downey | Mar. 20, 1951 |
| 2,562,311 | Goldberg | July 31, 1951 |

FOREIGN PATENTS

| Number | Country | Date |
|---|---|---|
| 541,029 | Great Britain | Nov. 10, 1941 |